US011204714B2

(12) United States Patent
Shah et al.

(10) Patent No.: US 11,204,714 B2
(45) Date of Patent: Dec. 21, 2021

(54) HYBRID USE OF NON-VOLATILE MEMORY AS STORAGE DEVICE AND CACHE

(71) Applicant: Microsoft Technology Licensing, LLC, Redmond, WA (US)

(72) Inventors: Purvi Shah, Redmond, WA (US); Georgiy Reynya, Redmond, WA (US); Slava Oks, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 458 days.

(21) Appl. No.: 16/168,032

(22) Filed: Oct. 23, 2018

(65) Prior Publication Data

US 2020/0125290 A1 Apr. 23, 2020

(51) Int. Cl.
*G06F 3/00* (2006.01)
*G06F 12/00* (2006.01)
(Continued)

(52) U.S. Cl.
CPC ............ *G06F 3/0656* (2013.01); *G06F 3/061* (2013.01); *G06F 3/065* (2013.01); *G06F 3/0634* (2013.01);
(Continued)

(58) Field of Classification Search
CPC .. G06F 12/0888; G06F 3/0656; G06F 3/0659; G06F 3/0634; G06F 12/0871
See application file for complete search history.

(56) References Cited

U.S. PATENT DOCUMENTS

| 5,933,846 A * | 8/1999 | Endo ................... G06F 3/0656 |
| | | 711/103 |
| 2014/0188952 A1* | 7/2014 | Killamsetti ........... G06F 16/172 |
| | | 707/822 |

(Continued)

FOREIGN PATENT DOCUMENTS

| CN | 108959129 B | 8/2021 |
| EP | 3170087 A1 | 5/2017 |
| EP | 3663927 A1 | 6/2020 |

OTHER PUBLICATIONS

"International Search Report and Written Opinion Issued in PCT Application No. PCT/US19/055277", dated Jan. 10, 2020, 10 Pages.
(Continued)

*Primary Examiner* — Reginald G Bragdon
*Assistant Examiner* — Michael L Westbrook
(74) *Attorney, Agent, or Firm* — Fiala & Weaver P.L.L.C.

(57) ABSTRACT

Buffers in a buffer pool refer to memory locations either in local memory or in non-volatile memory used as persistent storage. The local memory and non-volatile memory have access latencies of the same order of magnitude, or a small multiple of each other. A buffer pool management system has operations to manage transitions between these states. Buffer cache copies can be avoided for read-only data, which can improve ramp-up times in database systems, increase cache capacity and improve performance of write operations. Power consumption can be reduced by avoiding memory copies and decreasing overprovisioning. These advantages can be obtained while making minimal, if any, changes to computer programs implementing the database server, particularly subsystems such as write-ahead logging and page replacement algorithms.

20 Claims, 5 Drawing Sheets

(51) Int. Cl.
　　　G06F 3/06　　　　(2006.01)
　　　G06F 12/0871　　(2016.01)
　　　G06F 12/0888　　(2016.01)
(52) U.S. Cl.
　　　CPC .......... *G06F 3/0644* (2013.01); *G06F 3/0679* (2013.01); *G06F 12/0871* (2013.01); *G06F 12/0888* (2013.01)

(56)　　　　　　　References Cited

U.S. PATENT DOCUMENTS

2018/0005670 A1　　1/2018　Lee et al.
2019/0065383 A1*　2/2019　Loaiza ................... G06F 16/13

OTHER PUBLICATIONS

"Speed vs. Latency", Retrieved From: https://blog.csdn.net/SH_UANG/article/details/72905254, Jun. 7, 2017, 4 Pages.
"Deploying Server Persistent Memory on Windows Server 2012 R2", Retrieved From: https://h20195.www2.hpe.com/v2/getpdf.aspx/4AA6-4681ENW.pdf, Dec. 2017, 14 Pages.
"Flash Disruption Comes to Server Main Memory", Retrieved From: https://www.nextplatform.com/2015/08/05/flash-disruption-comes-to-server-main-memory/, Aug. 5, 2015, 8 Pages.
"HPE NVDIMMs", Retrieved From: https://www.hpe.com/us/en/product-catalog/servers/persistent-memory/pip.hpe-persistent-memory.1008649009.html, Jan. 1, 2018, 3 Pages.
"HPE NVDIMMs QuickSpecs", Retrieved From: https://h20195.www2.hpe.com/v2/getdocument.aspx?docname=a00026921enw, Feb. 12, 2018, 7 Pages.
"HPE Persistent Memory for HPE ProLiant Servers", Retrieved From: https://h20195.www2.hpe.com/v2/GetPDF.aspx/4AA6-4680ENW.pdf, Jan. 1, 2016, 10 Pages.
"HPE Reference Architecture for Microsoft SQL Server 2016 on HPE ProLiant DL380 Gen9 with HPE Persistent Memory", Retrieved From: https://h20195.www2.hpe.com/V2/getpdf.aspx/A00006919ENW.pdf?, Jan. 1, 2017, 17 Pages.
"Improving Microsoft SQL Server Database performance with HPE Persistent Memory on HPE ProLiant DL380 Gen9", Retrieved From: http://www.kompetera.dk/hjertesag/img/sql.pdf, Jan. 1, 2016, 15 Pages.
"Improving Oracle Database performance with HPE Persistent Memory on HPE ProLiant DL380 Gen9 Reference", Retrieved From: https://h20195.www2.hpe.com/v2/GetPDF.aspx/4AA6-6008ENW.pdf, Jan. 1, 2018, 14 Pages.
"Intel Lets Slip Broadwell, Skylake Xeon Chip Specs", Retrieved From: https://www.nextplatform.com/2015/05/26/intel-lets-slip-broadwell-skylake-xeon-chip-specs/, May 26, 2015, 7 Pages.
"Like Flash, 3D XPoint Enters the Datacenter as Cache", Retrieved From: https://www.nextplatform.com/2017/03/20/like-flash-3d-xpoint-enters-datacenter-cache/, Mar. 20, 2017, 13 Pages.
"NVDIMM—Fastest Tier in Your Storage Strategy", Published in Viking Technology whitepaper, Jan. 2014, 8 Pages.
"NVDIMM: Can't Wait for 3D XPoint, Can't Rely on DRAM Alone", Retrieved From: https://www.nextplatform.com/2015/12/07/nvdimm-cant-wait-for-3d-xpoint-cant-rely-on-dram-alone/, Dec. 7, 2015, 8 Pages.
"NVDIMM: Persistent Memory Performance", Retrieved From: https://www.micron.com/-/media/client/global/documents/products/product-flyer/nvdimm_flyer.pdf?la=en, Jan. 1, 2016, 2 Pages.
"Scaling the Growing System Memory Hierarchy", Retrieved From: https://www.nextplatform.com/2015/07/29/scaling-the-growing-system-memory-hierarchy/, Jul. 29, 2015, 9 Pages.
"Cost and performance benefits of deploying Microsoft SQL Server on HPE Persistent Memory and Microsoft Storage Spaces", Retrieved From: https://www.hpe.com/us/en/404.html, Apr. 2017, 14 Pages.
"Using NVDIMM Persistent Memory Server Technology with Linux Technical white paper", Retrieved From: https://h50146.www5.hpe.com/products/software/oe/linux/mainstream/support/whitepaper/pdfs/a00036172enw.pdf, Nov. 2017, 7 Pages.
Arulraj, et al., "Bridging The Archipelago Between Row-Stores and Column-Stores for Hybrid Workloads", In Proceedings of the 2016 International Conference on Management of Data. ACM, Jun. 26, 2016, 16 Pages.
Arulraj, et al., "How to Build a Non-Volatile Memory Database Management System", In Proceedings of SIGMOD, May 14, 2017, 6 Pages.
Arulraj, et al., "Let's Talk About Storage & Recovery Methods for Non-Volatile Memory Database Systems", In Proceedings of SIGMOD, May 31, 2015, 16 Pages.
Arulraj, et al., "Write-Behind Logging", In Proceedings of the VLDB Endowment 10.4, Nov. 1, 2016, 12 Pages.
Chang, et al., "Understanding Latency Variation in Modern DRAM Chips: Experimental Characterization, Analysis, and Optimization", In Proceedings of ACM SIGMETRICS Performance Evaluation Review vol. 44, No. 1, Jun. 14, 2016, 14 Pages.
Coburn, et al., "From ARIES to MARS: Transaction Support for Next-Generation, Solid-State Drives", In Proceedings of the twenty-fourth ACM symposium on operating systems principles, Nov. 3, 2013, 16 Pages.
Debrabant, et al., "A Prolegomenon on OLTP Database Systems for NonVolatile Memory", In Proceedings of ADMS@ VLDB, Jan. 1, 2014, 7 Pages.
Effelsberg, et al., "Principles of Database Buffer Management", In Proceedings of ACM Transactions on Database Systems (TODS), vol. 9 No. 4, Dec. 1984, 36 Pages.
Haerder, et al., "Principles of Transaction-Oriented Database Recovery", Published in ACM Computing Surveys (CSUR), Jan. 1, 1983, 31 Pages.
Kim, et al., "NVWAL: Exploiting NVRAM in Write-Ahead Logging", In Proceedings of ACM SIGOPS Operating Systems Review, Apr. 2, 2016, 14 Pages.
Mohan, et al., "Aries a transaction recovery method supporting fine granularity locking and partial rollbacks Using Write-Ahead Logging", Published in ACM Transactions on Database Systems (TODS), vol. 17, Mar. 1992, 69 Pages.
Ousterhout, "Can we Make This Easier?", In Proceedings of the USENIX Annual Technical Conference, Jan. 1, 2014, 2 Pages.
Pavlo, "Emerging Hardware Trends in Large-Scale Transaction Processing", Retrieved From: https://www.cs.cmu.edu/~pavlo/static/papers/IC_20150501_May_2015.pdf, May 2015, 4 Pages.
Viglas, "Write-limited sorts and joins for persistent memory", In Proceedings of Proceedings of the VLDB Endowment vol. 7, No. 5, Jan. 1, 2014, 12 Pages.
"Search Report and Written Opinion Issued in Luxembourg Application No. LU102287", dated Aug. 27, 2021, 10 Pages.

* cited by examiner

HYBRID USE OF NON-VOLATILE MEMORY AS STORAGE DEVICE AND CACHE

BACKGROUND

Recent developments in computer storage technology have provided a form of non-volatile memory (NVM) for use as a persistent storage device for supporting various storage systems, such as file systems and databases servers. Such non-volatile memory can replace disk-based storage devices and solid-state storage devices (SSD). When non-volatile memory is used as a persistent storage device within a file system or database server, the non-volatile memory is treated by a computer system as a form of storage device from which data is read into local memory, and to which data, if modified or newly created, is written from local memory. The computer system's memory management generally works the same whether the storage device is implemented using NVM, SSD or disk-based storage device.

SUMMARY

This Summary is provided to introduce a selection of concepts in a simplified form that are further described below in the Detailed Description. This Summary is intended neither to identify key or essential features, nor to limit the scope, of the claimed subject matter.

A common specification of memory and storage devices is latency, which is the amount of time between the time a read request is received on an input and the time the requested data is provided on an output. Some forms of non-volatile memory that can be used as a persistent storage device have a latency which is on the same order of magnitude as, or a small multiple of, latency of other memory devices which are commonly used as local memory in a computer system, such as dynamic random-access memory (DRAM) or static random-access memory (SRAM).

Using such a non-volatile memory, it is feasible to have applications access data directly from a non-volatile memory used as a storage device, without copying that data into the local memory and without significantly affecting performance. However, problems can arise if that data is to be modified. Most file systems and database systems guarantee a level of data atomicity and durability that could not be provided if an application were able to modify data directly in the non-volatile memory.

Commercial-grade file systems and database servers also generally have robust solutions for subsystems to ensure that level of data atomicity and durability while managing virtual memory and caches. For example, some database systems implement write-ahead logging to ensure atomicity and immutability of transactions when writing data to a database. As another example, computer systems generally perform memory management using a form of virtual memory and caching, both of which rely on page replacement algorithms, such as a least-recently used (LRU) replacement algorithm, to free up memory locations. Because commercial applications rely on stability of these subsystems, it is difficult to make changes to these subsystems without introducing significant risk.

A memory system has been developed in which non-volatile memory is used as a persistent storage device while allowing direct read access by applications to data stored in the non-volatile memory, bypassing local memory. This memory system, in applications such as a database server or a file system, can be implemented without changing any write-ahead logging or page replacement algorithms.

The memory system includes a buffer pool management system that manages access to data in the computer system through a buffer pool. A buffer pool is a data structure that defines a collection of logical buffers in which data resides. An application is assigned one or more logical buffers for reading and writing data. A logical buffer is a data structure that has, among other things, a state and a reference to a set of locations in memory. The locations can be in local memory, typically dynamic random-access memory, or non-volatile memory used as the persistent storage device. So long as the state of a logical buffer is read-only, the locations can refer to non-volatile memory. When the state of the logical buffer allows write access, the locations refer to local memory. When transitions occur between read and write access, data can be transferred between the non-volatile memory and the local memory, and the data in data structure for the logical buffer can be updated.

A currently-used buffer pool management system can be modified to implement this memory system in a manner transparent to write-ahead logging or page replacement algorithms, allowing non-volatile memory to be used as a persistent storage device in this memory system with minimal changes to a database server or file system. Copying of data to local memory can be avoided for read-only data, which can improve ramp-up times in database systems, increase cache capacity and improve performance of write operations. Power consumption can be reduced by avoiding memory copies and decreasing overprovisioning.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
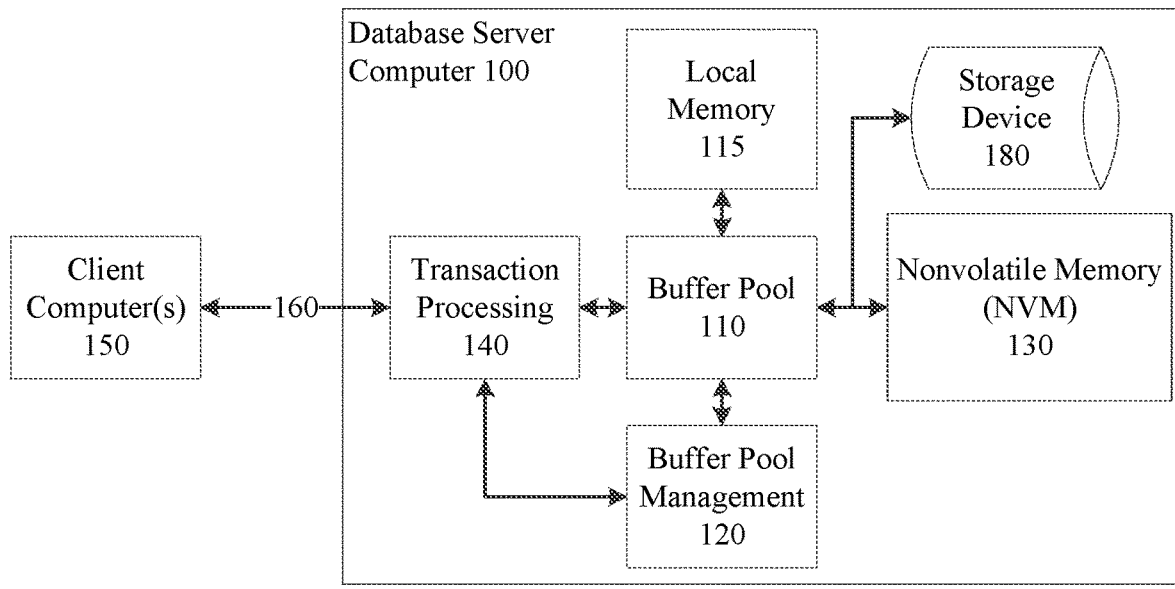
FIG. 1 is a block diagram of an example computing environment including a buffer pool management system for a computing system which uses non-volatile memory as a persistent storage device.

FIG. 1 is a block diagram of an example computing environment including a buffer pool management system for a computing system which uses non-volatile memory as a persistent storage device.

In FIG. 1, a database server computer 100 includes a transaction processing module 140 which is responsive to requests from applications (not shown) on client computers 150 to process data in a database supported by the database server computer 100. Typically, client computers 150 access the database server computer 100 over one or more computer networks 160. The computer network 160 can be any computer network supporting interaction between the client computers 150 and the database server computer 100, such as a local area network or a wide area network, whether private and/or publicly accessible, and can include wired and/or wireless connectivity. The computer network 160 can be implemented using any of several available network communication protocols, including but not limited to Ethernet and TCP/IP. The database server computer and client computers can be implemented using a computer such as described below in connection with FIG. 6.

The database server computer 100 stores data persistently in persistent storage devices, such as storage device 180 (see also 608 and 610 in FIG. 6) or non-volatile memory 130, which is used by the system as a persistent storage device in a manner similar to storage device 180. Storage device 180 may be implemented, for example, disk-based storage devices and solid state storage devices (SSD). The non-volatile memory 130 has a lower latency, as described below, than conventional disk-based storage devices and SSD.

While FIG. 1 illustrates a database server computer and a transaction processing module for a database, this configuration is merely illustrative. Other applications, such as but not limited to a file system, can be executed on a computer system which can use the memory system as described herein.

The transaction processing module 140 accesses data of a database through a buffer pool 110. A buffer pool management system 120 assigns one or more logical buffers in the buffer pool 110 to the transaction processing module 140. There may be multiple transaction processing modules 140, in which case the buffer pool management system 120 assigns a separate one or more logical buffers in the buffer pool 110 to each transaction processing module 140.

The buffer pool 110 is a data structure that defines a collection of logical buffers in which data resides for access by applications, such as the transaction processing modules 140. A logical buffer is a data structure that has, among other things, a state and a reference to a set of locations in memory. In this memory system, for data which is persistently stored in the non-volatile memory 130, the memory locations of a buffer can refer to a local memory 115, typically dynamic random-access memory (DRAM) or static random-access memory (SRAM), or to the non-volatile (NVM) 130 which is used as a persistent storage device, such as for a file system or database system.

An example technology to use for the NVM is any storage class memory which is persistent and byte-addressable. A device is byte-addressable if a single, addressable unit of data, e.g., a byte, can be accessed without requiring access to neighboring units of data. A nonvolatile memory is a computer storage device whose contents are not lost when power is removed. Memory is considered storage class if it is sufficiently high capacity to persistently store data in an application such as a file system or database system. For example, 3D-XPoint memory can be used, which is available under the QuantX brand from Micron Technology and under the OPTANE brand from Intel. NVDIMM memory modules from Hewlett Packard Enterprises also can be used. Other examples of non-volatile memory include NAND and NOR flash memories, ferroelectric RAM (FeRAM, F-RAM or FRAM), programmable metallization cell (PMC) memory, conductive bridging RAM (CBRAM), phase-change RAM (PRAM or PCM), silicon-oxide-nitride-oxide-silicon (SONOS) memory, resistive RAM (RRAM or ReRAM), Racetrack or domain-wall memory (DWM), carbon nanotube based RAM (NRAM or Nano-RAM), and spin-transfer torque-magnetoresistive random-access memory (STT-MRAM).

Local memory generally is volatile memory, which is computer memory that requires power to maintain the stored information, examples of which are conventional static RAM (SRAM) or dynamic RAM (DRAM). SRAM generally uses six transistors to store a bit of information. SRAM maintains its state so long as it is powered and has simple controls to read and write data given an input address. DRAM generally uses a single transistor and capacitor to store a bit of information. DRAM requires regular refresh signals to maintain its state and has more complex interactions than SRAM for reading and writing data given an input address. Other types of volatile memory that can be used as a local memory include but are not limited to zero-capacitor RAM (Z-RAM), a capacitor-less twin-transistor RAM (TTRAM). In some implementations, the local memory can be a form of non-volatile memory.

Latency of a memory or storage device, as used herein, is the amount of time between the time a read request is received on an input and the time the requested data is provided on an output. In the memory system described herein, some forms of non-volatile memory that can be used as a persistent storage device have a latency which is on the same order of magnitude as, or a small multiple of, latency of other memory devices which are commonly used as local memory in a computer system, such as dynamic random-access memory (DRAM) or static random-access memory (SRAM). Using such a non-volatile memory, it is feasible to have applications access data directly from the non-volatile memory without copying that data into the local memory and without significantly affecting performance.

For example, 3D-XPoint memory can be used as the non-volatile memory 130, and is available under the QuantX brand from Micron Technology and under the OPTANE brand from Intel. Such a non-volatile memory has a latency of about 300 nanoseconds to 500 nanoseconds. A typical DRAM used as local memory has a latency of about 100 nanoseconds, but latencies in the range of 10 nanoseconds to 100 nanoseconds can be available for local memory. The latency of the non-volatile memory can be any small multiple of the latency of the local memory where the access pattern to the data in the local memory versus the non-volatile memory does not substantially impact performance. Generally, a non-volatile memory that has a latency less than ten times the latency of the local memory is adequate. A non-volatile memory having a latency less than or equal to seven times the latency of the local memory will provide better performance on average. A non-volatile memory having a latency less than or equal to five times the latency of the local memory, or less than or equal to three times the latency of the local memory, is preferable. In some cases, a non-volatile memory may have a latency approximately the same as, or even lower than, the latency of the local memory. As will be described in more detail below, so long as the state of a logical buffer is read-only, its memory locations can refer to the non-volatile memory 130. When the state of the logical buffer allows write access, its memory locations refer to the local memory 115. When transitions occur between read and write access, the memory system can transfer data between the non-volatile memory and the local memory and can update the data in data structure for the logical buffer.

The database server computer also may include a subsystem (not shown) which ensures data atomicity and durability while writing data, such as a subsystem that implements write-ahead logging when writing data to a database. The buffer pool management system 120 also may include an algorithm that determines whether buffers in the buffer pool are freed for use for other data, typically called a "page replacement algorithm", such as a least-recently used (LRU) replacement algorithm. Both page replacement algorithms and write-ahead logging subsystems can be left unchanged by modifications to the buffer pool management system described herein.

Figure 2:
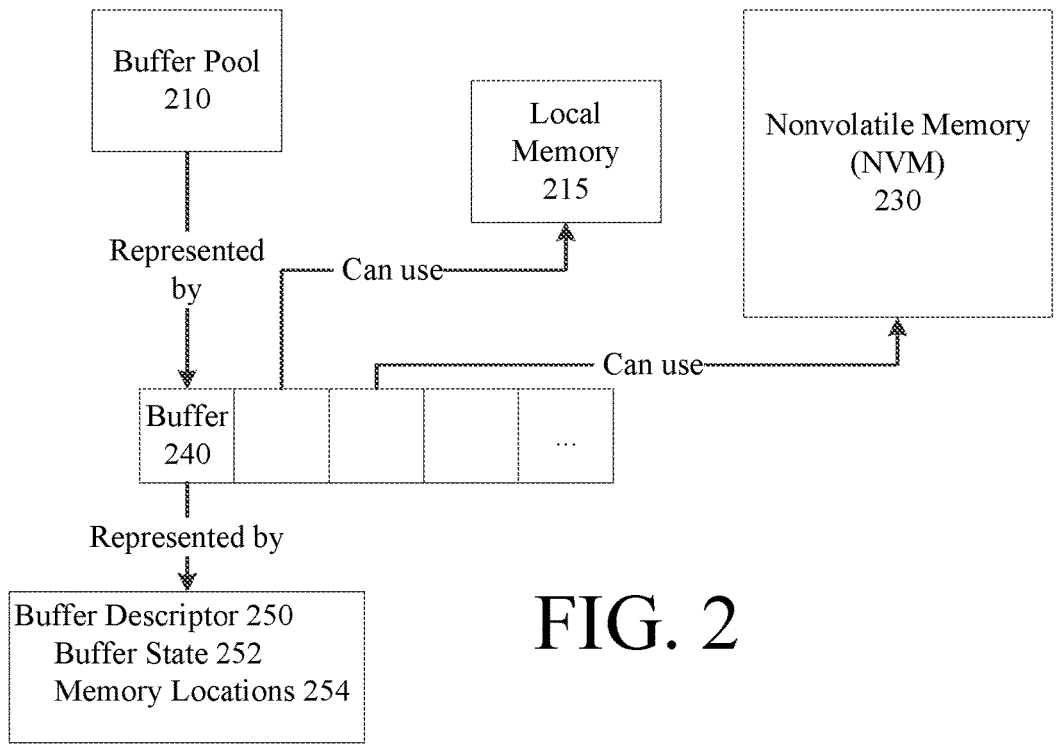
FIG. 2 is a schematic diagram illustrating how a buffer pool defines buffers allocated in either local memory or non-volatile memory.

Turning now to FIG. 2, an example data structure illustrating how a buffer pool is represented will now be described.

A buffer pool 210 is a data structure that defines a collection of logical buffers 240. The buffer pool data structure can use any suitable structure to represent the collection of logical buffers, such as an array. Each logical buffer 240 is represented by a data structure, herein called a buffer descriptor 250. A buffer descriptor 250 can include, as shown in FIG. 2, data defining a buffer state 252 and a reference 254 to memory locations, such as a pointer. The buffer state can be selected from a set of possible states of the buffer, including, for example, read-only, ready to dirty, dirty (which means the data in the buffer has been modified or is new and is not yet written to persistent storage), or other state. A logical buffer can use memory locations either in the local memory 215 (such as DRAM) or in the nonvolatile memory (NVM) 230. Thus, the reference 254 to memory locations can be a reference to memory locations either in the local memory or in the non-volatile memory. While the buffer descriptor 250 as illustrated in FIG. 2 includes one field 254 for this reference, in some implementations the buffer descriptor 250 can include two references, one for a reference to local memory and the other for a reference to non-volatile memory.

How applications, such as a transaction processing module 140, access data stored in the buffer pool, and how the buffer pool management system 120 operates to manage such a buffer pool, will now be described in connection with FIGS. 3-5, using FIG. 2 as an illustrative example of how the buffer pool can be implemented. This explanation begins with a quick overview of how a computer manages the interaction between applications and a memory management system of the computer.

An application such as the transaction processing module 140, is assigned a range of memory locations in a virtual memory of the computer. A memory management system of the computer maps this range of memory locations in the virtual memory to buffers in the buffer pool 210. The buffer pool management system determines which buffers 240 are available or free, and which buffers are used.

When an application requests access to data which is stored persistently in the non-volatile memory, a file system or database server typically instructs the memory management module to perform memory mapping, which means a range of addresses in the application's virtual address space are mapped to a range within the data. This correlation allows applications to treat the data as if it is in local memory. The memory management system manages movement of data into and out of the buffer pool 210 in a manner transparent to the application. The memory management module will transfer a range of data from non-volatile memory into an available buffer in the buffer pool when access to data in that range of data is requested by the application. If a buffer is not available in the buffer pool, the buffer pool management system, using a replacement algorithm, identifies one or more buffers to be made free. A variety of replacement algorithms can be used, such as a least recently used (LRU) algorithm, an example of which is found in Effelsberg, W., et al., "Principles of Database Buffer Management", in ACM Transactions on Database Systems, Volume 9, Issue 4, pp. 560-595, December 1984, hereby incorporated by reference.

In this context, when the application creates new data or modifies data that it has read, the buffer used by the application which stores the new data or modified data, cannot be made free by the buffer pool management system before logging a commit record for a transaction (set of actions that need to be atomic and durable) to durable storage. Such buffers are commonly called "dirty". A buffer that contains data from a file or database that is intended to be modified, such as a file that has been open for write access, but where the data has not yet been modified, can be distinguished from a buffer with modified data. Such a buffer of unmodified data can be called "ready to dirty". Such data, and buffers including read-only data, can readily be made free by the buffer pool management system.

In database systems, and some file systems and some other computer systems, additional protocols are used to ensure data atomicity and durability. For example, a database system generally does not allow a "dirty" buffer to be freed before logging a commit record for a transaction (set of actions that need to be atomic and durable) to durable storage. Some well-known principles in transaction-oriented systems to allow for recovery in the event of failures include atomicity, consistency, isolation, and durability. See Haerder, T., and Reuter, A., "Principles of Transaction-Oriented Database Recovery—A Taxonomy", in ACM Computing Surveys, vol. 15, No. 4, pp. 287-317, December 1983, hereby incorporated by reference. Such principles are typically embodied in commercial implementations of transactional database systems and other transaction-oriented systems such as distributed file systems, distributed operating systems, relational database systems, object-oriented database systems, fault-tolerant computer systems, highly available computer systems, real-time operating systems, object-oriented operating systems, distributed data collection systems, and the like.

For example, a database server may implement write-ahead logging (WAL). In a WAL-based system, data in a dirty buffer is written back to the same storage location in non-volatile memory from where it was read. Also, log records representing changes to the data must already be on durable storage before the changed data can replace the previous version of that data on nonvolatile storage. In other words, the system is not allowed to write data from a dirty buffer to nonvolatile memory until at least undo portions of log records which describe the changes to the data have been written to durable storage. Details of an implementation of write-ahead logging are found in Mohan, C., et al., "ARIES: A Transaction Recovery Method Supporting Fine-Granularity Locking and Partial Rollbacks Using Write-Ahead Logging", in ACM Transactions on Database Systems, Vol. 17, No. 1, pp. 94-162, March 1992, hereby incorporated by reference.

The buffer pool and buffer pool management system, an example of which is shown and described herein in connection with FIGS. 2-5, can be implemented in a manner transparent to page replacement algorithms and write-ahead logging. Since such subsystems generally have robust implementations in commercial database systems, avoiding changes to those subsystems is highly desirable.

Implementations of such a buffer pool and buffer pool management system, where the latency of the non-volatile memory used as persistent storage and the local memory are on the same order of magnitude, take advantage of the latency of the non-volatile memory while leveraging its durability. Buffers in the buffer pool can link directly to locations in the non-volatile memory. By linking directly to locations in non-volatile memory, data in those locations can be accessed for read operations without copying the data into the local memory.

In the context of database operations, while a workload on the database progresses from initialization to a steady state, its working set (i.e., the data it is currently using) grows gradually at a rate depending on the computation time and the available bandwidth populating memory from persistent storage. During the ramp-up phase between initialization and steady state, data generally would be read from non-volatile memory into local memory. With the buffer pool and buffer pool management system herein, data that is not to be modified can be accessed directly from the non-volatile memory without copying to local memory. The local memory remains free to achieve high throughput on other operations that involve writing data. By avoiding copying read-only data into local memory, the ramp-up phase can be shorter. Also, the capacity of buffer pool in the local memory appears larger to other components in the system. Due to the low latency of the non-volatile memory and the elimination of redundant input and output operations to copy data into local memory, transaction throughput should improve.

In one implementation, the buffer pool management system ensures that buffers only link to clean data if the buffers are linked to locations in non-volatile memory. When an application requests write access to the data, the buffer pool management system copies the data into a buffer in the local memory and the buffer data structure is updated to refer to the memory locations in the local memory. The buffer pool management system can write buffers with dirty data in local memory back to the non-volatile memory. After the buffer pool management system writes dirty data to the non-volatile memory, the buffer data structure can be updated to refer to the location in the non-volatile memory and indicate the data is clean; the buffer pool management system can mark the memory locations in local memory as freed.

Writing of data back to the non-volatile memory may occur as part of checkpointing, during "lazy" write operations, or due to operation of the replacement algorithm, or for other reasons. Checkpointing involves writing all dirty pages that were modified before a given time back to the durable storage. "Lazy" writes can occur when data is no longer part of a working set, generally based on a usage history tracked for each buffer.

A few operations can be implemented within the buffer pool management system to support these various uses of the non-volatile memory.

Figure 3:
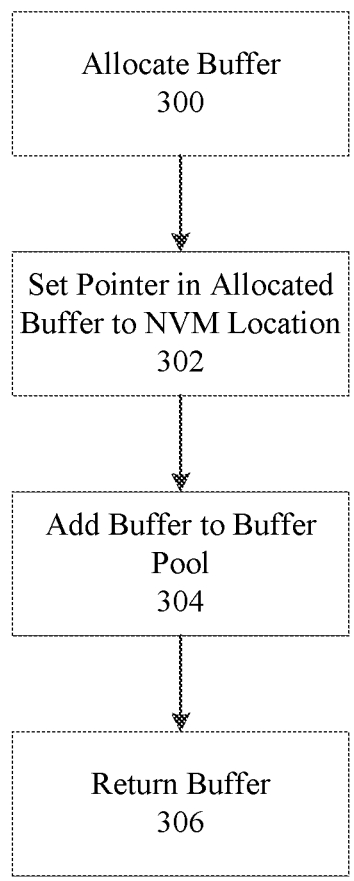
FIG. 3 is a flowchart describing an operation of allocating a buffer for read access directly from the non-volatile memory.

Referring now to FIG. 3, when an application requests access to a range of data that is not in the buffer pool, the buffer pool management system allocates 300 a buffer, e.g., by creating a buffer descriptor 250. The buffer pool management system sets 302 the memory location (e.g., 254), such as a pointer, in the allocated buffer to the memory locations of the data in the non-volatile memory. The allocated buffer is added 304 to the buffer pool data structure (e.g., 210). The buffer state (e.g., 252) can be set to "clean" or "read-only". The buffer is returned to the application.

Figure 4:
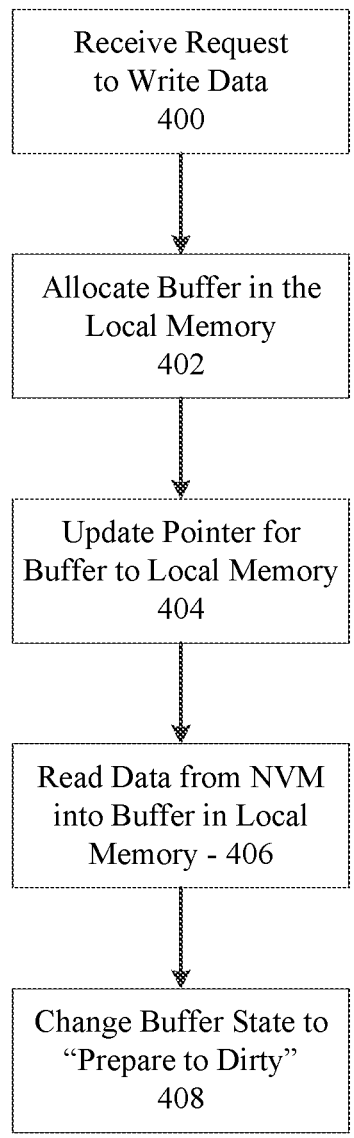
FIG. 4 is a flowchart describing an operation of modifying a buffer for accessing data from local memory.

Turning now to FIG. 4, if an application will modify the data in a buffer that refers to locations in non-volatile memory, as indicated at 400, then the data is retrieved from non-volatile memory into the local memory. The buffer pool management system requests a memory manager to allocate 402 a buffer, i.e., a set of memory locations, in the local memory. The buffer pool management system then updates 404 the memory location (e.g., 254) stored in the buffer data structure 250 to refer to the buffer allocated in the local memory. The buffer pool management system then causes the data to be read 406 from the non-volatile memory to the buffer allocated in the local memory, and can change 408 the state (e.g., 252) to indicate that the data is ready to be modified (e.g., "ready to dirty"). If data in a buffer referencing local memory is modified, the buffer pool management system can change the state (e.g., 252) of the buffer to be "dirty".

Figure 5:
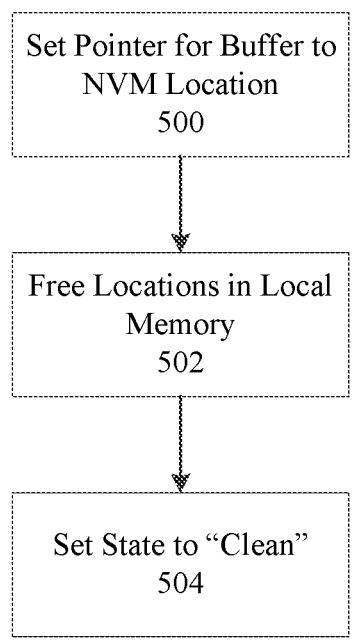
FIG. 5 is a flowchart describing an operation of freeing local memory referenced by a buffer and causing the buffer to reference the non-volatile memory.

Turning now to FIG. 5, if the data is never modified, and the memory locations in the local memory are to be freed, the buffer pool management system can modify 500 the buffer data structure (e.g., 254) to refer to the memory locations in non-volatile memory of that data. The buffer pool management system than can instruct the memory manager to free 502 the locations in the local memory. The state (e.g., 252) of the buffer data structure can be set 504 to "clean". The same steps in FIG. 5 can also be implemented as part of a write operation, when the data in the buffer is "dirty" and is written back out to non-volatile memory.

The foregoing operations implement the primary transitions of each buffer from referencing the non-volatile memory, to referencing the local memory, and then back to the non-volatile memory. Any action that attempts to write data into a buffer referencing non-volatile memory invokes the operation of FIG. 4 to move the data into local memory and causes the buffer to reference local memory. Any action that can free memory locations in local memory reference by a buffer results in clean data in the non-volatile memory, invokes the operation of FIG. 5, and causes the buffer to reference non-volatile memory. These operations can occur transparently to any write-ahead logging or page replacement algorithm.

A variety of other operations can be optimized in view of the possibility that a buffer may be referencing clean data in non-volatile memory. For example, it is not necessary to free buffers from the buffer pool if those buffers reference non-volatile memory. Checkpointing and input/output prediction can eliminate penalties that are based on disk-based access times.

By allowing buffers in a buffer pool to reference memory locations either in local memory or in non-volatile memory used as durable storage, where the local memory and non-volatile memory have access latencies of the same order of magnitude, or small multiple of each other, and by having operations to manage transitions between these states, several advantages are obtained. Copying of data to local memory can be avoided for read-only data, which can improve ramp-up times in database systems, increase cache capacity and improve performance of write operations. Power consumption can be reduced by avoiding memory copies and decreasing overprovisioning. The local memory remains free to achieve high throughput on other operations that involve writing data. The capacity of buffer pool in the local memory appears larger to other components in the system. Due to the low latency of the non-volatile memory and the elimination of redundant input and output operations to copy data into local memory, transaction throughput should improve. These and other advantages can be obtained while making minimal, if any, changes to computer programs implementing the database server, particularly subsystems such as write-ahead logging and page replacement algorithms.

Figure 6:
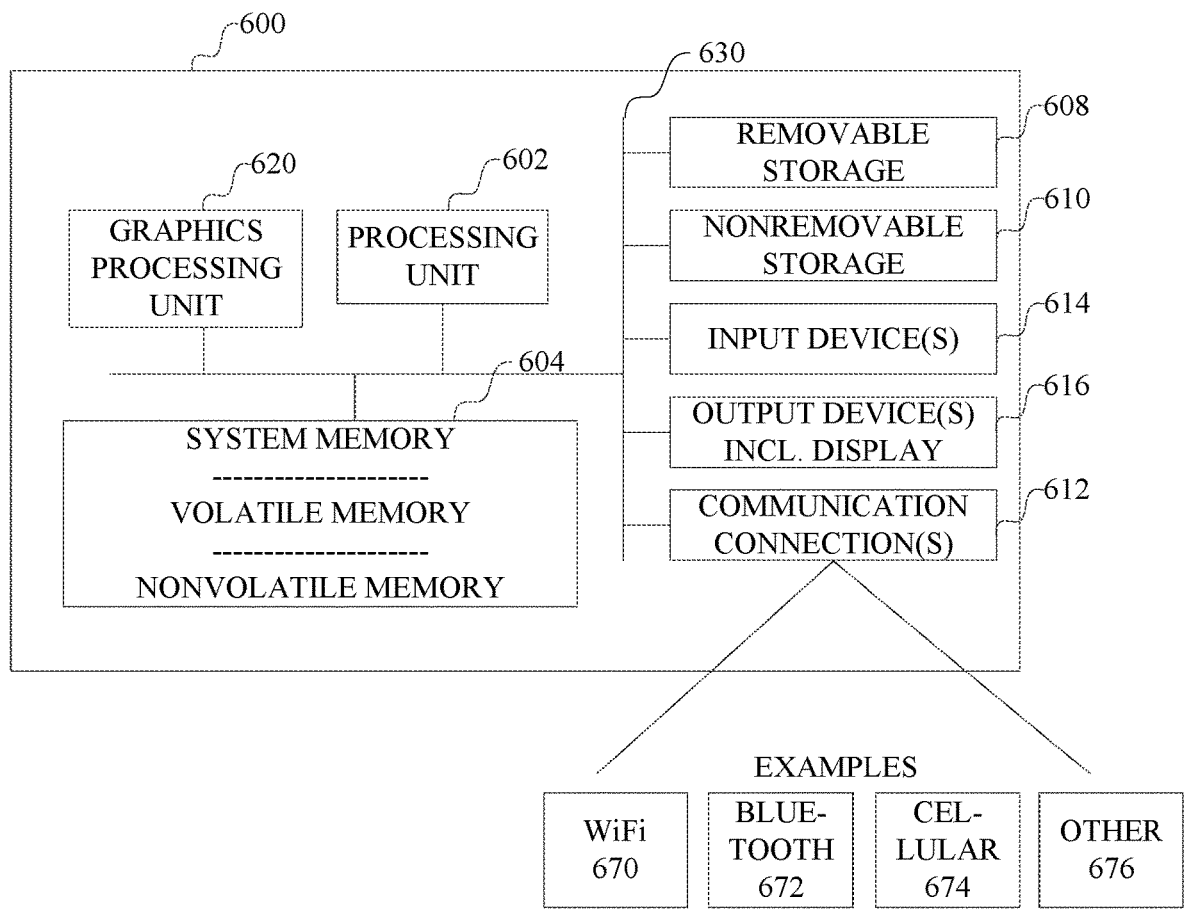
FIG. 6 is a block diagram of an example computer.

Having now described an example implementation, FIG. 6 illustrates an example of a computer with which compo- nents of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, a computer 600 includes a processing system comprising at least one processing unit 602 and at least one memory 604. The processing unit 602 can include multiple processing devices; the memory 604 can include multiple memory devices. A processing unit 602 comprises a processor which is logic circuitry which responds to and processes instructions to provide the functions of the computer. A processing device can include one or more processing cores (not shown) that are multiple processors within the same logic circuitry that can operate independently of each other. Generally, one of the processing units in the computer is designated as a primary processor, typically called the central processing unit (CPU). One or more additional co-processing units, such as a graphics processing unit (GPU) 620, also can be present in the computer. A co-processing unit comprises a processor that performs operations that supplement the central processing unit, such as but not limited to graphics operations and signal processing operations.

The memory 604 may include volatile computer storage devices (such as dynamic random-access memory (DRAM) or other random-access memory device), and non-volatile computer storage devices (such as a read-only memory, flash memory, and the like) or some combination of the two. Other computer storage devices, such as dedicated memory or registers, also can be present in the one or more processors. The computer 600 can include additional computer storage devices (whether removable or non-removable) such as, but not limited to, magnetically-recorded or optically-recorded disks or tape. Such additional computer storage devices are illustrated in FIG. 1 by removable storage device 608 and non-removable storage device 610. Such computer storage devices 608 and 610 typically are nonvolatile storage devices. The various components in FIG. 6 are generally interconnected by an interconnection mechanism, such as one or more buses 630.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 604, removable storage 608 and non-removable storage 610 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 600 may also include communications connection(s) 612 that allow the computer to communicate with other devices over a communication medium.

Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 612 are devices, such as a wired network interface, wireless network interface, radio frequency transceiver, e.g., Wi-Fi 670, cellular 674, long term evolution (LTE) or Bluetooth 672, etc., transceivers, navigation transceivers, e.g., global positioning system (GPS) or Global Navigation Satellite System (GLONASS), etc., transceivers, and network interface devices 676, e.g., Ethernet, etc., or other device, that interface with communication media to transmit data over and receive data from signal propagated over the communication media.

The computer 600 may have various input device(s) 614 such as a pointer device, keyboard, touch-based input device, pen, camera, microphone, sensors, such as accelerometers, thermometers, light sensors and the like, and so on. The computer 600 may have various output device(s) 616 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 608 and 610, communication connections 612, output devices 616 and input devices 614 can be integrated within a housing with the rest of the computer, or can be connected through various input/output interface devices on the computer, in which case the reference numbers 608, 610, 612, 614 and 616 can indicate either the interface for connection to a device or the device itself.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 6. To manage access to data stored in nonvolatile computer storage devices, the computer also generally includes a file system which maintains files of data or database system which maintains data structures in persistent storage. A file is a named logical construct which is defined and implemented by the file system to map a name and a sequence of logical records of data to the addressable physical locations on the computer storage device. Thus, the file system hides the physical locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts, and graphical user interfaces, described in connection with FIGS. 1-10, as well as any operating system, file system, database system, and applications on a computer in FIG. 6, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system includes a local memory and a non-volatile memory for persistent storage of data. The local memory has a first latency and the non-volatile memory has a second latency. A buffer pool management system stores a buffer pool data structure defining a collection of buffers. A buffer is defined by a buffer data structure. The buffer data structure includes data indicative of a state of the buffer and data indicative of memory locations storing data for the buffer. In a first state, the buffer references memory locations in local memory. In a second state the buffer references memory locations in the non-volatile memory. In the second state, an application executing on the computer system accesses data for the buffer from the non-volatile memory without copying the data to the local memory.

In another aspect, a computer-implemented process is performed by a computer including a local memory and a non-volatile memory for persistent storage of data, wherein the local memory has a first latency and the non-volatile memory has a second latency. The process includes storing a buffer pool data structure defining a collection of buffers, each buffer being defined by a buffer data structure, wherein the buffer data structure includes data indicative of a state of the buffer and data indicative of memory locations storing data for the buffer. In a first state, the buffer references memory locations in local memory, and in a second state the buffer references memory locations in the non-volatile memory. The process includes, in response to an application requesting access to data from a buffer in the second state, accessing data for the buffer from the non-volatile memory without copying the data to the local memory.

In another aspect, a computer includes a local memory and a non-volatile memory for persistent storage of data. The local memory has a first latency and the non-volatile memory has a second latency. The computer includes means for storing a data structure defining a collection of buffers, includes data indicative of a state of each buffer and data indicative of memory locations storing data for each buffer. In a first state, a buffer references memory locations in local memory. In a second state a buffer references memory locations in the non-volatile memory. In the second state, an application executing on the computer system accesses data for the buffer from the non-volatile memory without copying the data to the local memory.

In any of the foregoing aspects, the first latency and the second latency are such that the access pattern to the data in the local memory versus the non-volatile memory does not substantially impact performance when data is read directly from the non-volatile memory without reading the data into buffers in the local memory. For example, the first latency and the second latency can be on the same order of magnitude. In some implementations, the second latency can be less than or equal to ten times the first latency. In some implementations the second latency can be less than or equal to five time the first latency. In some implementations, the second latency can be less than or equal to three times the first latency.

In any of the foregoing aspects, to free memory locations in the local memory referenced by a buffer, the buffer pool management system can write the data to memory locations in the non-volatile memory and can change the buffer to the second state and to reference the memory locations of the data in the non-volatile memory. In such implementations, when the application prepares to modify data for a buffer and the buffer is in the second state, the buffer pool management system can copy the data for the buffer from the memory locations in the non-volatile memory to memory locations in the local memory, can change the buffer to the first state, and can change the buffer to reference the locations in the local memory.

In any of the foregoing aspects, operation of the buffer pool management system can be transparent to operation of write-ahead logging performed by the computer system.

In any of the foregoing aspects, operation of the buffer pool management system can be transparent to operation of page replacement algorithms performed by the computer system.

In any of the foregoing aspects, the application can be a database system.

In any of the foregoing aspects, the application can be a distributed file system.

In another aspect, an article of manufacture includes at least one computer storage, and computer program instructions stored on the at least one computer storage. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

The subject matter defined in the appended claims is not necessarily limited to the specific implementations described above. The specific implementations described above are disclosed as examples only.

What is claimed is:

1. A computer system, comprising:
   a processing system comprising a processing device and computer storage,
   the computer storage including a local memory and a non-volatile memory for persistent storage of data, wherein the local memory has a first latency and the non-volatile memory has a second latency;
   wherein the computer storage stores computer program instructions that, when executed by the processing system, configures the computer system to comprise:
   a buffer pool management system storing a buffer pool data structure defining a collection of buffers, each buffer being defined by a buffer data structure, wherein the buffer data structure includes an indicated buffer state of the buffer and data indicative of memory locations storing data for the buffer, wherein in a first state indicated for a buffer state of allowing write access, the buffer references memory locations in local memory, and in a second state indicated for a buffer state of read only, the buffer references memory locations in the non-volatile memory;
   wherein in the second state, an application executing on the computer system accesses data for the buffer from the non-volatile memory without copying the data to the local memory; and
   wherein the buffer pool management system is configured to change the buffer state between the first and second states.

2. The computer system of claim 1, wherein, to free memory locations in the local memory referenced by a buffer, the buffer pool management system writes the data to memory locations in the non-volatile memory and changes the buffer state to the second state and to reference the memory locations of the data in the non-volatile memory.

3. The computer system of claim 2, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

4. The computer system of claim 1, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

5. The computer system of claim 1, wherein operation of the buffer pool management system is transparent to operation of write-ahead logging performed by the computer system.

6. The computer system of claim 1, wherein the first latency and the second latency are on the same order of magnitude.

7. The computer system of claim 1, wherein the first latency and second latency are such that an access pattern to data in the local memory versus the non-volatile memory does not substantially impact performance when data is read directly from the non-volatile memory without reading the data into buffers in the local memory.

8. A computer-implemented process, the computer-implemented process performed by a computer comprising a processing system with a processing device and computer storage, the computer storage including a local memory and a non-volatile memory for persistent storage of data, wherein the local memory has a first latency and the non-volatile memory has a second latency, wherein the computer storage stores computer program instructions that, when executed by the processing system, configures the computer system to perform a process comprising:
   storing a buffer pool data structure defining a collection of buffers, each buffer being defined by a buffer data structure, wherein the buffer data structure includes an indicated buffer state of the buffer and data indicative of memory locations storing data for the buffer, wherein in a first state indicated for a buffer state of allowing write access, the buffer references memory locations in local memory, and in a second state indicated for a buffer state of read only, the buffer references memory locations in the non-volatile memory;
   in response to an application requesting access to data from a buffer in the second state, accessing data for the buffer from the non-volatile memory without copying the data to the local memory; and
   in response to an application requesting a change in the indicated buffer state of a buffer, changing the buffer state of the buffer between the first and second states.

9. The computer-implemented process of claim 8, wherein, to free memory locations in the local memory referenced by a buffer, the buffer pool management system writes the data to memory locations in the non-volatile memory and changes the buffer state to the second state and to reference the memory locations of the data in the non-volatile memory.

10. The computer-implemented process of claim 9, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

11. The computer-implemented process of claim 8, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

12. The computer-implemented process of claim 9, wherein operation of the buffer pool management system is transparent to operation of write-ahead logging performed by the computer system.

13. The computer-implemented process of claim 9, wherein the first latency and the second latency are on the same order of magnitude.

14. The computer-implemented process of claim 9, wherein the second latency is less than or equal to ten times the first latency.

15. An article of manufacture comprising a computer storage device having computer program instructions stored thereon, wherein the computer program instructions, when processed by a computer comprising a processing device and computer storage, the computer storage including a local memory and a non-volatile memory for persistent storage of data, wherein the local memory has as first latency and the non-volatile memory has a second latency, configures the computer to comprise:

a buffer pool management system storing a buffer pool data structure defining a collection of buffers, each buffer being defined by a buffer data structure, wherein the buffer data structure includes an indicated buffer state of the buffer and data indicative of memory locations storing data for the buffer, wherein in a first state indicated for a buffer state of allowing write access, the buffer references memory locations in local memory, and in a second state indicated for a buffer state of read only, the buffer references memory locations in the non-volatile memory;

wherein in the second state, an application executing on the computer system access data for the buffer from the non-volatile memory without copying the data to the local memory; and wherein the buffer pool management system is configured to change the buffer state between the first and second states.

16. The article of manufacture of claim 15, wherein, to free memory locations in the local memory referenced by a buffer, the buffer pool management system writes the data to memory locations in the non-volatile memory and changes the buffer state to the second state and to reference the memory locations of the data in the non-volatile memory.

17. The article of manufacture of claim 16, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

18. The article of manufacture of claim 15, wherein, when the application prepares to modify data for a buffer and the buffer state is the second state, the buffer pool management system copies the data for the buffer from the memory locations in the non-volatile memory to memory locations in the local memory, changes the buffer state to the first state, and changes the buffer to reference the locations in the local memory.

19. The article of manufacture of claim 15, wherein operation of the buffer pool management system is transparent to operation of write-ahead logging performed by the computer system.

20. The article of manufacture of claim 15, wherein the first latency and the second latency are on the same order of magnitude.

* * * * *